US009697671B2

(12) United States Patent
Moody

(10) Patent No.: US 9,697,671 B2
(45) Date of Patent: Jul. 4, 2017

(54) TOURNAMENT VIDEO POKER

(76) Inventor: Ernest W Moody, Las Vegas, NV (US)

( * ) Notice: Subject to any disclaimer, the term of this patent is extended or adjusted under 35 U.S.C. 154(b) by 2198 days.

(21) Appl. No.: 12/240,910

(22) Filed: Sep. 29, 2008

(65) Prior Publication Data

US 2009/0088238 A1 Apr. 2, 2009

Related U.S. Application Data

(60) Provisional application No. 60/975,963, filed on Sep. 28, 2007.

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)

(52) U.S. Cl.
CPC .......... *G07F 17/32* (2013.01); *G07F 17/3276* (2013.01); *G07F 17/3293* (2013.01)

(58) Field of Classification Search
USPC ...... 463/10, 11, 12, 13, 14, 20, 22; 273/292, 273/274, 237
See application file for complete search history.

(56) References Cited

U.S. PATENT DOCUMENTS 5,755,621 A * 5/1998 Marks et al. .................. 463/42
5,823,873 A 10/1998 Moody
5,879,233 A 3/1999 Stupero
6,077,163 A 6/2000 Walker et al.
6,174,237 B1 1/2001 Stephenson
6,312,334 B1 * 11/2001 Yoseloff .......................... 463/25
6,319,127 B1 11/2001 Walker et al.
6,511,068 B1 * 1/2003 Sklansky ........... A63F 3/00157 273/237
6,517,074 B1 2/2003 Moody et al.
7,104,542 B2 9/2006 Peterson
7,422,521 B2 9/2008 Peterson
7,494,410 B2 2/2009 Romik
2004/0248642 A1 12/2004 Rothschild
2005/0127606 A1 * 6/2005 Snow et al. ................. 273/292
2006/0157934 A1 * 7/2006 Yoseloff .................... A63F 1/18 273/292
2007/0259709 A1 * 11/2007 Kelly et al. ..................... 463/20
2008/0113816 A1 * 5/2008 Mahaffey et al. .............. 463/42
2009/0315264 A1 * 12/2009 Snow ................. A63F 3/00157 273/292

* cited by examiner

*Primary Examiner* — Adetokunbo O Torimiro
(74) *Attorney, Agent, or Firm* — John Edward Roethel

(57) ABSTRACT

Each player who is participating in the video poker tournament plays a designated group of video poker hands. The designated group of video poker hands comprises preselected starting hands so that each tournament participant plays the same starting hands. After the group of video poker hands has been completed, the player with the highest score or highest amount of accrued credits is awarded a prize. Besides awarding a prize to the player with the highest score, other lesser prizes could be awarded to other players who have high scores. Prizes could also be awarded to players who achieve a final score of at least a certain level.

7 Claims, 2 Drawing Sheets

TOURNAMENT VIDEO POKER

CROSS-REFERENCE TO RELATED APPLICATION

This application is based on and claims the benefit of U.S. Provisional Application Ser. No. 60/975,963, filed Sep. 28, 2008, the disclosure of which is incorporated herein in its entirety.

This invention relates to electronic video poker games, and more particularly to electronic video poker games in which a player competes in a tournament format by playing video poker.

BACKGROUND OF THE INVENTION

Traditionally, electronic casino games, such as video poker, slot machines, video keno and the like, have been played on stand alone gaming machine. Each player is seated in front of his own gaming machine and the electronic computer controls necessary to operate and play the gaming machine are contained in each gaming machine.

With the advent of player tracking systems, gaming machines now contain the electronics necessary for the machine's computer controls to communicate with a remote server which can be located on the property of the gaming establishment or can even be located off the gaming establishment's property at a remote location.

Currently, the evolution of electronic gaming machines is toward what is known as "server-based gaming" (SBG) in which all of the operation control of each gaming machine is provided on a server located at a remote location from the gaming machine itself, either on-site or off-site the property of the gaming location.

For example, SBG is explained in U.S. Published Patent Application 20040248642 (Rothschild), the disclosure of which is hereby incorporated by reference.

An advantage of the SBG environment on electronic gaming machines is the possibility of providing communication between two or more electronic gaming machines. The present invention allows two or more players, each sitting at his own gaming machine, to participate in a video poker tournament. The video poker tournament can require that each player make a wager or payment to enter the tournament or the video poker tournament may be provided by the gaming establishment without requiring each player to pay to participate.

There are many types of video poker games that can be played on an electronic gaming machine. Traditional video poker is a single player game in which a player plays one poker hand against a pay table, and not against other players' hands or a dealer's hand. The player attempts to achieve final card combinations that are based on poker hand rankings. Typically an initial hand is dealt to the player and the player is allowed to discard unwanted cards and replacement cards are provided for the discarded cards to form a final poker hand. The final poker hand is compared to a pay table to determine winning and losing hands and the player receives a payout based on the amount of his wager for a winning hand.

Multiple hand video poker allows the player to play multiple hands of video poker at the same time. Typically, the player is dealt two or more starting hands with each starting hand having the same cards. The player is allowed to discard unwanted cards and replacement cards are provided for the discarded cards to form the final poker hands. The player may discard the same cards from each starting hand or the player may discard different cards from each starting hand. Each of the final poker hands are compared to a pay table to determine winning and losing hands and the player receives a payout based on the amount of his wager for each winning hand. Typical multiple hand poker games come in three, five, ten, twenty, twenty-five, fifty and one hundred hand poker formats. Multiple hand poker is described in U.S. Pat. No. 5,823,873 and U.S. Pat. No. 6,517,074, the disclosure of each is hereby incorporated by reference.

Flat rate play video poker changes the manner in which rounds of video poker are purchased, with each round of video poker typically comprising the player of one hand of cards. As discussed above, in traditional video poker, a player makes a wager for each round that is played. In flat rate player video poker, a player purchases a fixed number of rounds of video poker. The player then knows how many rounds of video poker the player can play for the amount of money he has invested. Flat rate play video poker is described in U.S. Pat. No. 6,077,163 and U.S. Pat. No. 6,319,127, the disclosure of each is hereby incorporated by reference.

There is a need for allowing any of these forms of video poker to be played in a tournament format in which multiple players can compete against one another. This would add excitement to the play of video poker and provide for larger payouts than can be provided in typical single player versions of video poker.

Slot machine and video poker machine tournaments have been conducted in casinos for some time. The typical tournament is to have each tournament player play a similar slot machine or video poker machine for a designated length of time. The player or players with the highest scores at the end of the tournament receive awards in the form of cash or prizes.

A drawback to the typical video poker tournament format is that each player may receive different starting hands during his time of playing the video poker machine. The players who receive better starting hands will have a better chance of winning the tournament.

There is a need to provide a tournament format in which each player has the same opportunity to receive awards and this can be achieved by providing each player in the tournament with the same starting hands.

SUMMARY OF THE INVENTION

Each player who is participating in the video poker tournament plays a designated group of video poker hands. The designated group of video poker hands comprises preselected starting hands so that each tournament participant plays the same starting hands. After the group of video poker hands has been completed, the player with the highest score or highest amount of accrued credits is awarded a prize.

Besides awarding a prize to the player with the highest score, other lesser prizes could be awarded to other players who have high scores. Prizes could also be awarded to players who achieve a final score of at least a certain level.

Each participant could purchase an entry into the tournament or the gaming establishment could award free or partially paid entries into the tournament.

DETAILED DESCRIPTION OF THE PREFERRED EMBODIMENTS

The method of the present invention involves having multiple players participate in a video poker tournament. Each player uses a video poker machine that is configured to interact with the main computer in a SBG environment. This allows the operation of each video poker machine to be controlled and monitored by the main computer.

Version 1

Figure 1:
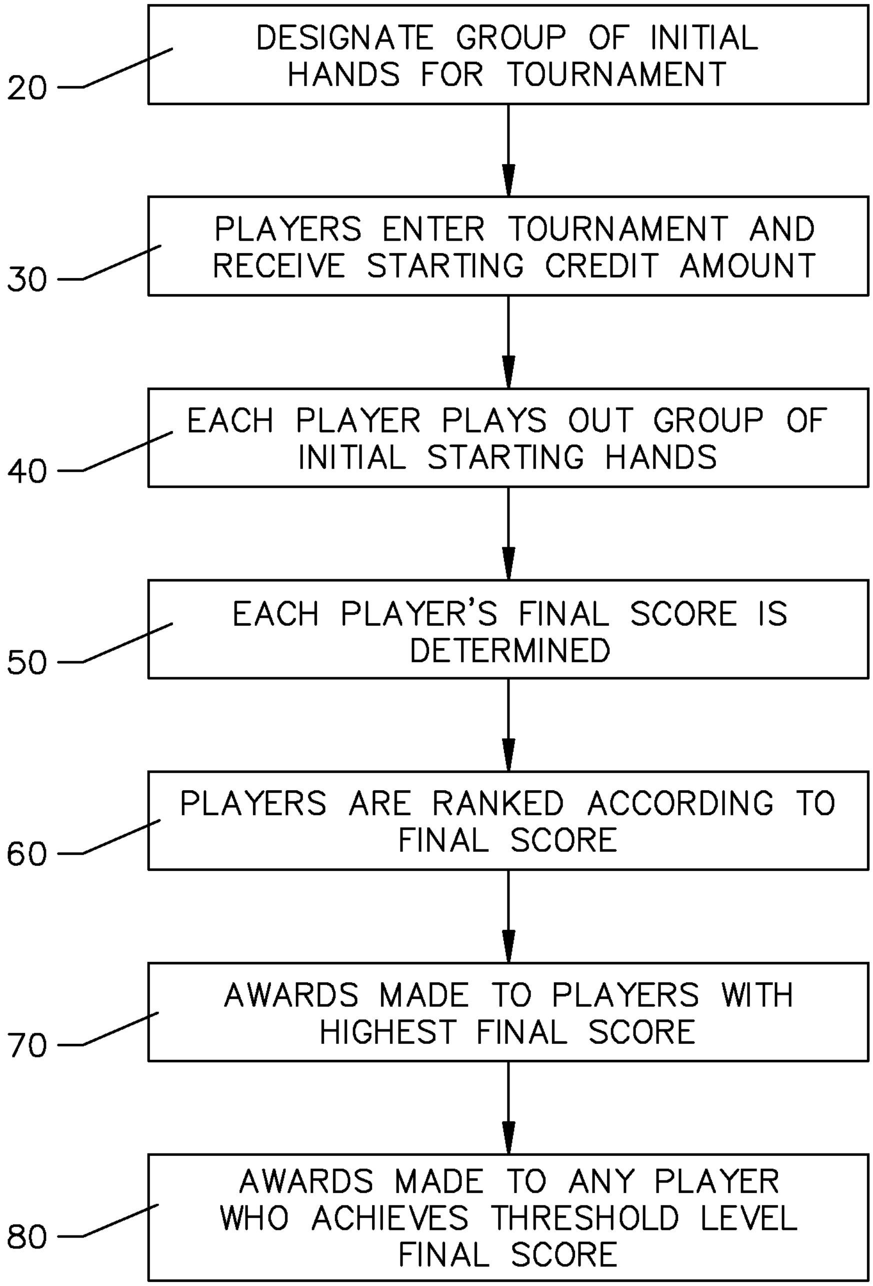
FIG. 1 shows a flow chart of an embodiment of the method of the present invention.

Version 1 of the present invention involves having multiple players participate in a single level video poker tournament. FIG. 1 shows in flow chart format the steps of the method of the tournament play.

Prior to the start of the tournament, a group of initial hands are designated 20 as the starting hands to be used by all players in the tournament. For example, the video poker game format for the tournament could be Double Double Bonus Poker and each video poker machine would be configured to provide a Double Double Bonus Poker pay table. Alternatively, any suitable video poker game format and any suitable pay table could be used as long as each player in the tournament is playing the same game format and using the same pay table.

Each player who wishes to play in the tournament enters the tournament 30 by paying an entry fee or by using a complimentary or discounted entry provided by the gaming establishment. The gaming establishment could award the player a free or partially paid entry into the tournament as a marketing tool for the gaming establishment or as a reward to the player for previous gaming activity.

Upon activating his entry into the tournament, each player starts with a fixed number of credits, say 200 credits, on his video poker machine.

The tournament comprises the group of initial hands which is a fixed number of hands of play of video poker. Each player plays out his starting hands 40 until the player has either exhausted his credits or completed all of the starting hands. The play is in the conventional manner of play of video poker in which the player discards unwanted starting cards from each starting hands and replacement cards are displayed for the discarded cards which results in a final poker hand.

Predetermined final poker hands are considered winning card arrangements and the player receives a score for each hand based on the poker hand ranking of the final hand and the amount of credits wagered by the player. The possible poker hand rankings are shown in the pay table associated with the poker game format being used.

The tournament method of the present invention may allow the player to vary the number of credits that may be wagered on each starting hand. For example if a group of ten starting hands are used, the player may bet five to fifty credits on each of starting hands one through five and may be bet five to all of his remaining credits on each of starting hands six through ten. At any point that the player has no credits remaining, the player may not play any remaining starting hands and he receives a final score of zero.

The player plays his video poker hands for each of starting hands one through ten and the player accrues credits for each final winning hand achieved in any round. At the end of group of starting hands, say ten hands, the player will have achieved a final score 50 represented by the number of credits that the player has remaining on the credit meter.

The player's final score is recorded and posted for other players to beat. As the tournament progresses, each player's final score is determined and the players are ranked according to their final scores 60.

At the conclusion of the tournament, awards are made to the players with the highest scores 70, with the top final score typically receiving the best award and the other places receiving lesser awards.

An award pool comprising money or other valuable prizes could be established by the gaming establishment to award to the tournament winners. The player with the highest final score could receive the entire award pool or the awards could be made for finishing in the group with the highest final scores. For example, in a tournament having 1000 participants, awards could be made to the players with the highest fifty scores. In a preferred embodiment of the present invention, the prizes to be awarded are posted at the start of the tournament so that each participant would know how many places are being paid and how high a final score would be needed to receive an award regardless of the final placing of the player in the tournament. Alternatively, a conversion table could be posted so that each player knows what award he would receive for achieving various levels of his final score.

The player may also receive a cash bonus or other prize, such as a free entry into a subsequent tournament, for achieving a final score of at least some threshold level, say 500 credits 80.

Each player in the tournament plays the same ten starting hands. The ten starting hands can be randomly selected in advance by the main computer to which all of the video poker machines are connected. Or a preselected group of ten starting hands may be programmed and stored in the main computer for display to each player participating in the tournament.

Any of the various types of video poker may be used in this tournament game play. Each of the ten hands may be single hand poker, multiple hand poker or flat rate play video poker. Or the game types may be mixed together with some of the hands being single hand poker, some of the hands may be multiple hand poker and some of the hands may be flat rate play poker.

If preselected starting hands are used, certain interesting starting hands may be included to add excitement to the game play. For example, the last hand of play could be a starting hand showing four cards to a Royal Flush or three Aces so that a player has the chance to receive a large payout on the last hand should the player achieve a Royal Flush or Four Aces.

Likewise, if the final hand were in a multiple hand format such as ten play poker, the player could have the opportunity to achieve a large payout on the final hand should the player be dealt a good starting hand ten times as would happen in ten play poker.

The tournament could run until a fixed length of time has expired or until a fixed number of players have participated or until a player achieves a predetermined final score. This would allow a particular player to participate more than once in the tournament.

Version 2

Figure 2:
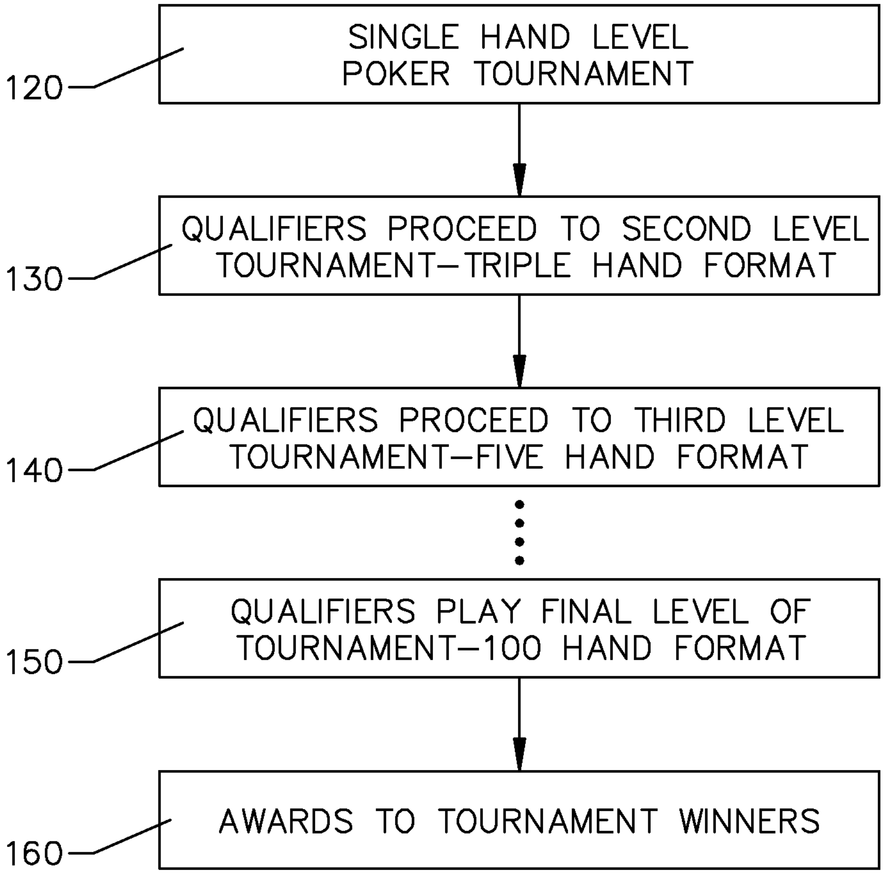
FIG. 2 shows a flow chart for another embodiment of the method of the present invention.

Version 2 of the present invention involves a tournament format in which the player must proceed through various levels of tournament play to achieve the highest payout and FIG. 2 shows the format for this tournament version. For example, in the first level of the tournament, the player plays ten starting of single hand video poker 120. The players with the highest scores, say the top 500 players, advance to the second tournament level 130.

In the second tournament level, the players play ten starting hands of triple hand video poker with the another cut being made of the players with the highest scores advancing to the third level of the tournament 140.

The tournament could proceed through consecutive levels of five hand poker, ten hand poker, fifty hand poker to the final round of one hundred hand poker 150. Whatever credits the player has achieved at the end of each level would carryover to the next round.

As discussed above, an award pool comprising money or other valuable prizes could be established by the gaming establishment to award to the tournament winners 160. The player with the highest final score could receive the entire award pool or the awards could be made for finishing in the group with the highest final scores. For example, in a multi-level tournament having 5000 participants, awards could be made to the players with the highest fifty scores at the end of the final level. The player with the highest score at the end of each intermediate level could also receive an award.

In a preferred embodiment of the present invention, the prizes to be awarded are posted at the start of the tournament so that each participant would know how many places are being paid and how high a final score would be needed to receive an award regardless of the final placing of the player in the tournament. Alternatively, a conversion table could be posted so that each player knows what award he would receive for achieving various levels of his final score.

The variables in the multi-level tournament format of the present invention would be the amount of the entry fee to be paid by each player, the number of levels of the tournament, the number of rounds of video poker to be played at each level of the tournament and the types of poker games to be played at each level. The value and amounts of the prizes awarded would be selected to provide an appropriate profit to the gaming establishment operating the tournament.

What is claimed is:

1. A method of playing a video poker tournament that includes two or more players, each sitting as his own video poker machine, to participate in the video poker tournament, comprising:

a) designating a group of initial hands as the starting hands to be used in the tournament;

b) at least a first player and a second player entering the tournament; each of the first player and the second player being provided with a separate video poker gaming machine, each video poker machine containing electronic computer controls necessary to operate and play the video poker machine, a video screen display, at least one input device used by the player to operate the video poker device, an acceptor for receiving from each of the first player and the second player an entry to participate in the tournament, and the electronic computer controls being used to display a game play of the video poker tournament and a result of the video poker tournament including any award made to the player;

c) allocating to each player a fixed number of credits to be used to play in the tournament;

d) each player in the tournament playing out, according to the conventional manner of play of video poker, by using his credits the group of initial hands and achieving a group of final hands and allowing each player to vary a number of credits used on each initial hand;

e) giving each final hand of the group of final hands a score based on the poker hand ranking of each final hand;

f) determining a final score for each player based on the player's group of final hands;

g) ranking each player according to the final score of the player; and h) making an award to the player with the highest rank.

2. The method of claim 1 including providing that a player receives a final score of zero if the player has no credits remaining before the player has played out all of the initial hands.

3. A method of playing a video poker tournament that includes two or more players, each sitting as his own video poker machine, to participate in the video poker tournament, comprising:

a) providing at least two levels of play for the tournament;

b) at least a first player and a second player entering the tournament; each of the first player and the second player being provided with a separate video poker gaming machine, each video poker machine containing electronic computer controls necessary to operate and play the video poker machine, a video screen display, at least one input device used by the player to operate the video poker device, an acceptor for receiving from each of the first player and the second player an entry to participate in the tournament, and the electronic computer controls being used to display a game play of the video poker tournament and a result of the video poker tournament including any award made to the player;

c) designating a first level group of initial hands as the starting hands to be used in a first level of the tournament;

d) each player in the tournament playing out, according to the conventional manner of play of video poker, the first level group of initial hands and achieving a first level group of final hands;

e) giving each final hand of the first level group of final hands a score based on the poker hand ranking of each final hand;

f) determining a first level score for each player based on the player's first level group of final hands;

g) ranking each player according to the first level score of the player;

h) advancing a number of players with the highest first level scores to a second level of the tournament;

i) designating a second level group of initial hands as the starting hands to be used in the second level of the tournament;

j) each player in the second level of the tournament playing out, according to the conventional manner of play of video poker, the second level group of initial hands and achieving a second level group of final hands;

k) giving each final hand of the second level group of final hands a score based on the poker hand ranking of each final hand;

l) determining a second level score for each player based on the player's second level group of final hands;

m) ranking each player according to the second level score of the player; and n) making an award to the player with the highest rank.

4. The method of claim 3 including making an award to each player who achieves a high rank.

5. The method of claim 3 including making an award to each player who achieves at least a rank of a certain level.

6. The method of claim 3 including allowing each player to vary a number of credits used on each initial hand.

7. The method of claim 6 including providing that a player receives a final score of zero if the player has no credits remaining before the player has played out all of the initial hands.

* * * * *